US010115141B1

(12) United States Patent
Warman et al.

(10) Patent No.: US 10,115,141 B1
(45) Date of Patent: Oct. 30, 2018

(54) SECURE PROXY SERVICE

(71) Applicant: Amazon Technologies, Inc., Seattle, WA (US)

(72) Inventors: Leon Robert Warman, Aptos, CA (US); Kurt Kufeld, Seattle, WA (US); Peter Sven Vosshall, Bainridge Island, WA (US); Kyle Bradley Peterson, Seattle, WA (US); Peter Frank Hill, Seattle, WA (US); Chelsea Celest Krueger, Seattle, WA (US); Arun Sundaram, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 909 days.

(21) Appl. No.: 14/495,843

(22) Filed: Sep. 24, 2014

(51) Int. Cl.
*G06Q 30/00* (2012.01)
*G06Q 30/06* (2012.01)
*G06Q 20/38* (2012.01)
*H04L 29/06* (2006.01)

(52) U.S. Cl.
CPC ....... *G06Q 30/0615* (2013.01); *G06Q 20/383* (2013.01); *H04L 63/08* (2013.01)

(58) Field of Classification Search
CPC .................................................... G06Q 30/00
See application file for complete search history.

(56) References Cited

U.S. PATENT DOCUMENTS 6,271,840 B1 8/2001 Finseth et al.
6,356,908 B1 3/2002 Brown et al.
7,051,084 B1 5/2006 Hayton et al.
7,191,211 B2 3/2007 Tuli
7,213,748 B2 * 5/2007 Tsuei ..................... G06Q 10/08
235/375

(Continued)

FOREIGN PATENT DOCUMENTS

WO   WO 2000014648    * 3/2000  .............. G06Q 30/00

OTHER PUBLICATIONS

Lambert, Patrick, "The basics of using a proxy server for privacy and security", IT Security, dated Dec. 4, 2012. (Year: 2012).*

(Continued)

*Primary Examiner* — Mark A Fadok
(74) *Attorney, Agent, or Firm* — Knobbe, Martens, Olson & Bear LLP

(57) ABSTRACT

A system is configured to receive a network resource request from a user device configured with a browsing application, wherein the request includes identification data associated with the user device. The system transmits, to a network resource provider, a request for the network resource, wherein the request transmitted to the network resource provider excludes identification data included in the request received from the user device. The system receives from the network resource provider a response, including a document comprising a field configured to receive payment information for an item purchase. The system receives from the browsing application an indication that an anonymous payment instrument, associated with a first entity different than the user, is to be used to purchase a first item at a first price. The system causes information regarding the anonymous payment instrument to be provided to the network resource provider.

12 Claims, 6 Drawing Sheets

(56) References Cited

U.S. PATENT DOCUMENTS

| | | | | |
|---|---|---|---|---|
| 7,379,913 B2* | 5/2008 | Steele | | G06Q 20/10 705/38 |
| 7,490,069 B2* | 2/2009 | Camenisch | | G06Q 20/02 705/74 |
| 7,698,422 B2* | 4/2010 | Vanderhook | | G06Q 30/02 709/224 |
| 7,930,252 B2* | 4/2011 | Bender | | G06F 21/6254 705/50 |
| 8,341,036 B2* | 12/2012 | Hartman | | G06Q 10/087 705/26.2 |
| 8,423,457 B1* | 4/2013 | Schattauer | | G06Q 20/10 705/14.26 |
| 8,520,904 B2* | 8/2013 | Bous | | G06Q 20/383 382/115 |
| 8,843,997 B1* | 9/2014 | Hare | | H04L 63/0281 709/200 |
| 8,977,568 B1* | 3/2015 | Schattauer | | G06Q 20/10 705/16 |
| 9,262,623 B2* | 2/2016 | Stecher | | H04L 63/0421 |
| 9,268,933 B2* | 2/2016 | Stecher | | G06F 21/45 |
| 9,589,266 B2* | 3/2017 | Pourfallah | | G06Q 20/3276 |
| 9,760,871 B1* | 9/2017 | Pourfallah | | G06Q 20/10 |
| 2001/0029496 A1* | 10/2001 | Otto | | G06Q 20/04 705/74 |
| 2003/0120608 A1* | 6/2003 | Pereyra | | G06Q 20/12 705/64 |
| 2004/0254893 A1* | 12/2004 | Tsuei | | G06Q 10/08 705/74 |
| 2007/0214037 A1* | 9/2007 | Shubert | | G06Q 20/02 705/7.32 |
| 2008/0229025 A1 | 9/2008 | Plamondon | | |
| 2012/0022942 A1 | 1/2012 | Holloway et al. | | |
| 2012/0215834 A1 | 8/2012 | Chen et al. | | |
| 2012/0253852 A1* | 10/2012 | Pourfallah | | G06Q 20/3276 705/4 |
| 2013/0325686 A1* | 12/2013 | Howes | | G06Q 40/04 705/37 |
| 2014/0059658 A1* | 2/2014 | Stecher | | G06F 21/45 726/5 |
| 2014/0136973 A1 | 5/2014 | Kumar et al. | | |
| 2015/0228004 A1* | 8/2015 | Bednarek | | G06Q 30/0633 705/26.8 |

OTHER PUBLICATIONS

U.S. Appl. No. 14/285,300, filed May 22, 2014, Batni et al.

U.S. Appl. No. 14/285,442, filed May 22, 2014, Jain et al.

U.S. Appl. No. 14/285,504, filed May 22, 2014, Jain et al.

Anonymous, :ShrinkTheWeb (stw) Website Previews Plugin, http://web.archive.org/web/20120710154658/http://wordpress.org/extend/plugins/shrinktheweb-web-site-preview-plugin/screenshots/, Jul. 10, 2012, 3 pages.

Anonymous, "ShrinkTheWeb—Website Previews API Documentation," http://web.archive.org/web/20121029152521/http://www.shrinktheweb.com/uploads/STW_API_Documentation.pdf, Oct. 29, 2012, 4 pages.

Esteveo, Martin, "Tiling in DirectX: Part 1", from gamedev.net, Jul. 24, 2000, 5 pages.

Esteveo, Martin, "Tiling in OpenGL," from gamedev.net, Dec. 12, 2000, 6 pages.

Kokkevis, Vanelis "GPU Accelerated Compositing in Chrome," The Chromium Projects, 2012, 9 pages.

PCWorld, Hands-on: Chrome Remote Desktop app for Android makes remote PC access easy, available at http://www.pcworld.com/article/2144562/hands-on-chrome-remote-desktop-app-for-android-makes-remote-access-easy.html, published Apr. 16, 2014 (last accessed May 22, 2014, 4 pages.

Microsoft Windows Help, Connect to another computer using Remote Desktop Connection, available at http://windows.microsoft.com/en-us/windows/connect-using-remote-desktop-connection#connect-using-remote-desktop-connection=windows-7 (last accessed May 22, 2014, 2 pages.

* cited by examiner

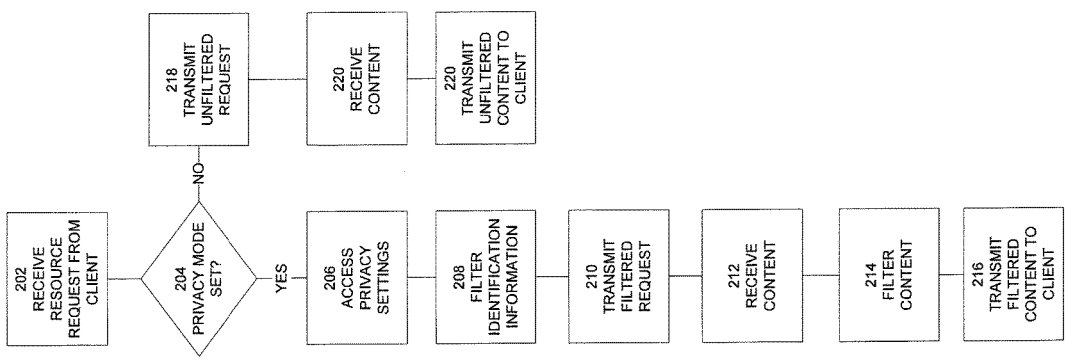

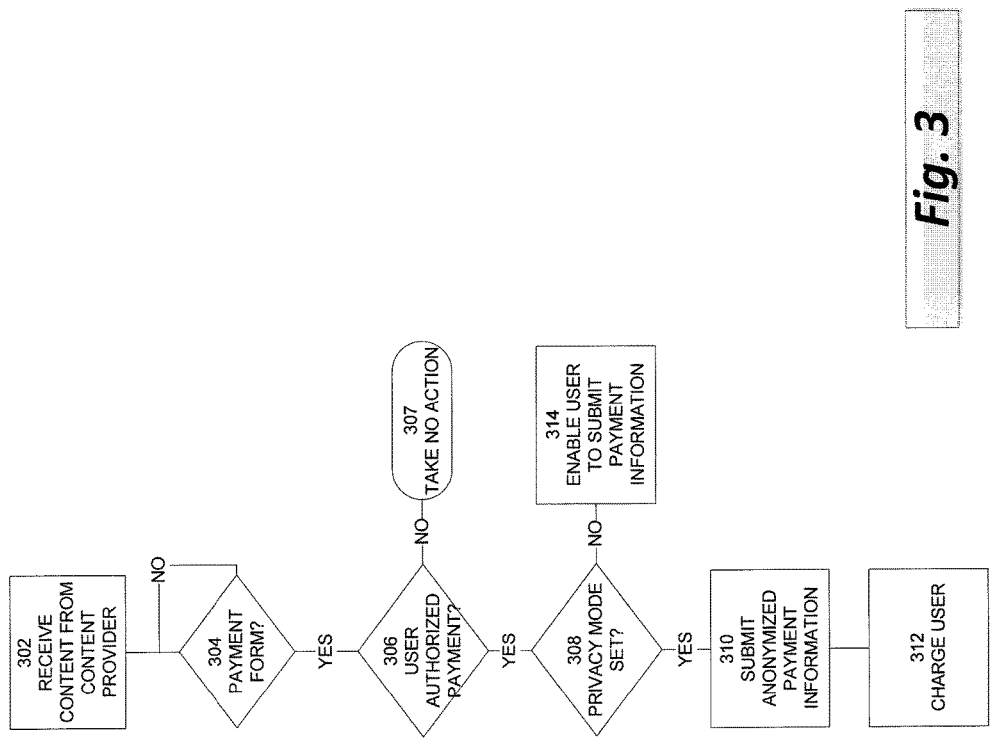

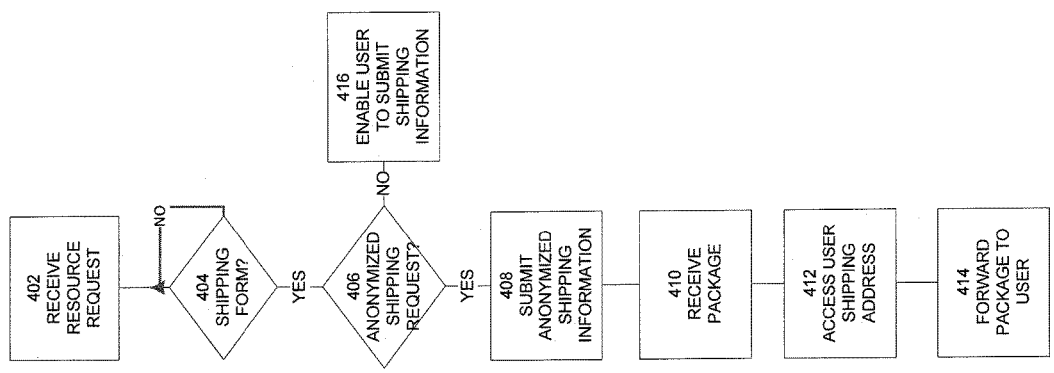

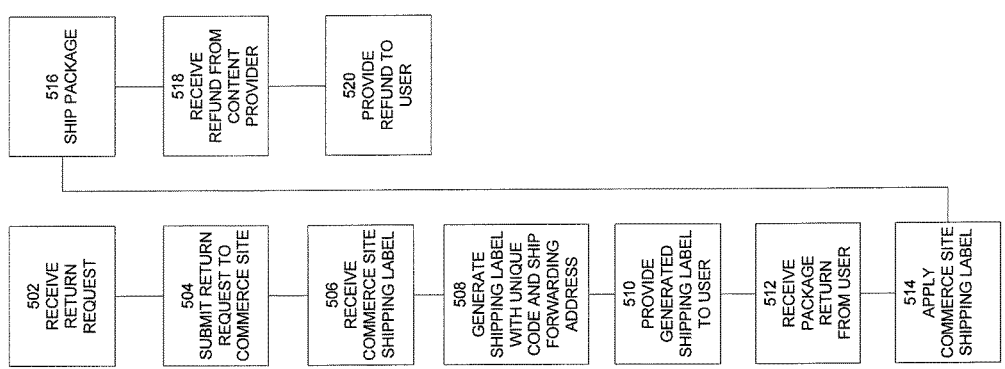

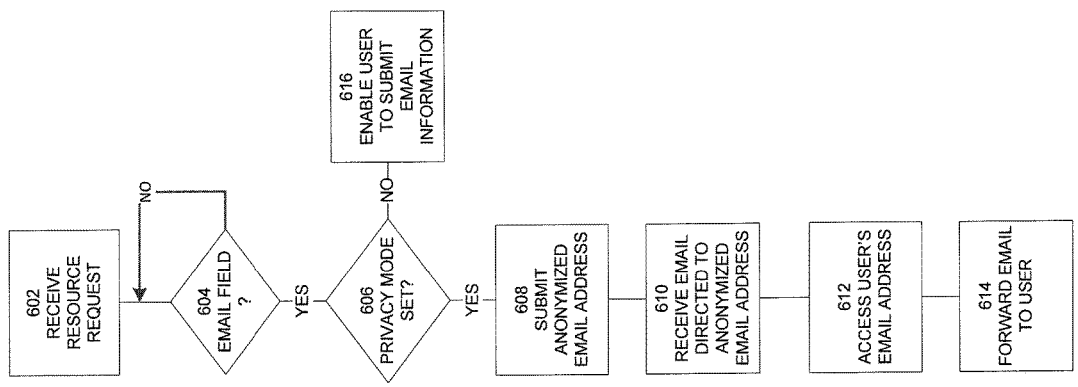

SECURE PROXY SERVICE

BACKGROUND

Web browsing has become essential in participating in modern commerce, social networking, content consumption, among other commonplace human activities. However, due to the type and degree of such Web browsing, a great deal of private and financial data is communicated over the Internet. For example, user credit card data, financial information, home addresses, shopping habits, and content consumption habits may be transmitted over the Internet. Such data may be used by others receiving or intercepting the data in an offensive or illicit manner. Further, a significant amount of information may be gathered regarding a user browsing the Internet from information automatically communicated by the user's browser to third party sites.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 2 illustrates an example process by which the access of a network resource is anonymized, according to one embodiment.

FIG. 3 illustrates an example process by which anonymized payment is performed, according to one embodiment.

FIG. 4 illustrates an example process by which anonymized shipping is performed, according to one embodiment.

FIG. 5 illustrates an example process by which an anonymized item return is performed, according to one embodiment.

FIG. 6 illustrates an example process by which an anonymized communication is performed, according to one embodiment.

DETAILED DESCRIPTION

Figure 1:
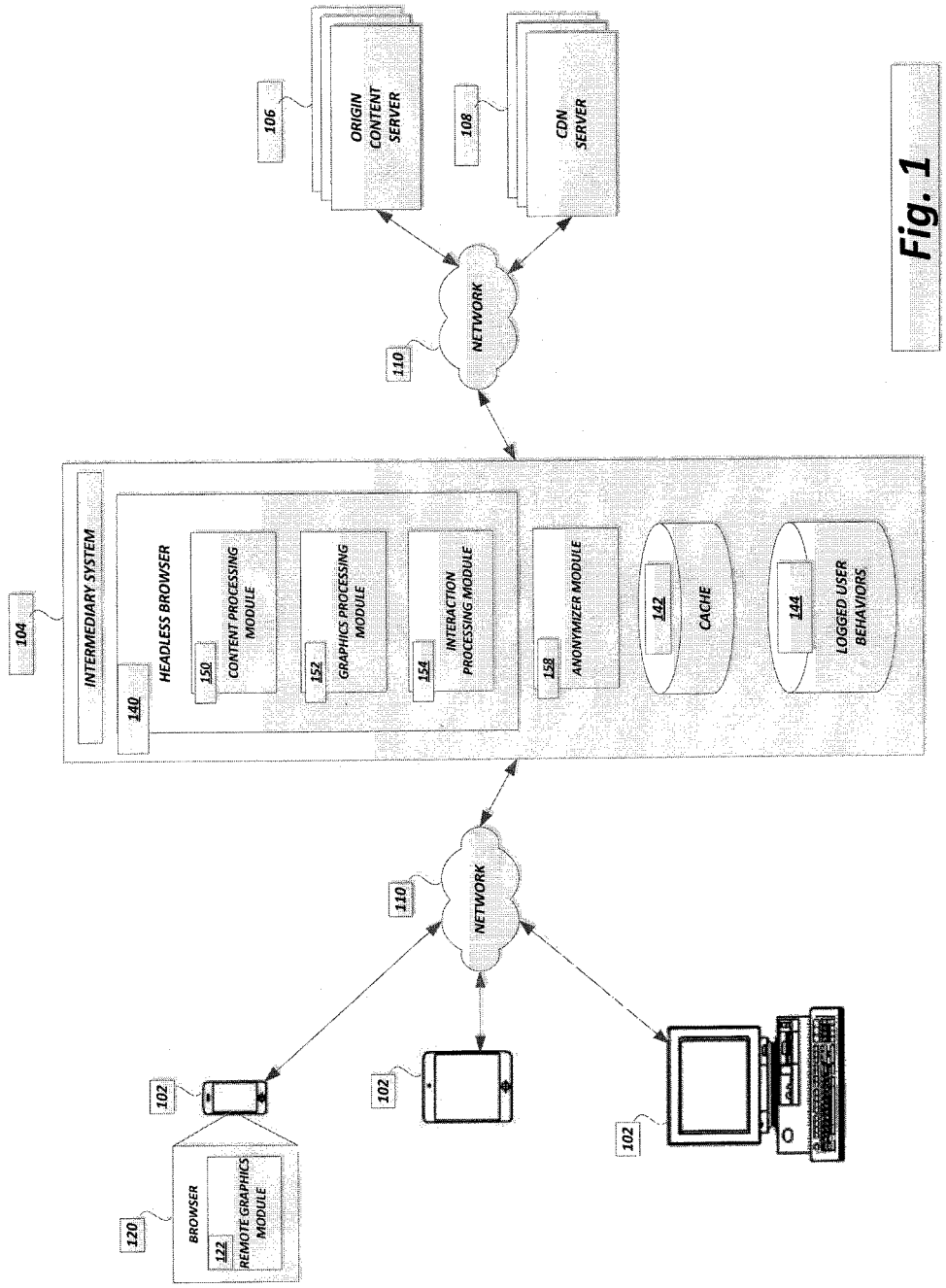
FIG. 1 illustrates an intermediary system that enables anonymized browsing according to one embodiment.

Processes and systems for anonymized network interactions and management thereof are described herein.

Although aspects of the embodiments described in the disclosure will focus, for the purpose of illustration, on anonymized network interactions using a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

As discussed above, a significant amount of information may be gathered regarding a user browsing the Internet from information automatically communicated by the user's browser to third party sites, which can adversely affect a user's privacy. In addition, user credit card data, home addresses, financial information, shopping habits, and content consumption habits are frequently transmitted by browsers over the Internet. Such data may be used by others receiving or intercepting the data in an offensive or illicit manner.

Accordingly, a secure system provides one or more services that enable users to interact with and engage in commerce with third parties, such as third parties that associated with commerce websites, while maintaining substantial anonymity. For example, certain embodiments enable a user to substantially anonymously access a network resource, such as a website or document (e.g., a webpage, word document, streaming media etc.), pay for items anonymously, receive order status information anonymously, and have items shipped to them anonymously using a trusted, known intermediary, thereby providing for secure, anonymous shopping. It is understood that while reference may be made to third party commerce sites for purposes of illustration, embodiments discussed herein may be used with other network resources. It is understood that the term "anonymous" as used herein is intended to convey that the user's identify cannot be easily determined by the third party site (although the trusted intermediary may know the user's identity).

A browser architecture may be used, wherein certain browser processes and functions are executed locally (e.g., on a user device, such as a user's computing device hosting the browser) and certain processes and functions are executed on a remote system, which may act as an intermediary system between the browser hosted on the user device and content provider systems. Such a configuration is sometimes referred to as a split browser. By way of illustration, in an example embodiment, for a given webpage requested by a browser hosted on the user device, the split browser system may determine which browser processes (e.g., networking, HTML processing, page rendering, etc.) are to be run locally on the user device and which browser processes to run remotely on the intermediary system (which may include one or more proxy servers).

By way of further illustration, the remote intermediary system may access network resources from third party content providers and may also pre-render (e.g., using a headless browser) portions or all of the requested network resources to facilitate display on certain types of devices, such as tablets and smartphones or other computing devices. For example, the remote intermediary system may request and receive the requested network resources, such as a webpage, and perform some or all of the following operations: parse the webpage HTML, convert the HTML tags to DOM (Document Object Model) nodes in a content tree, parse the style data in external CSS (Cascading Style Sheets) files and in style elements, generate a render tree, layout where a given node is to appear when displayed on the user device browser, traverse the render tree and generate painting instructions without actually displaying the content on an intermediate system display. The intermediary system can then transmit the pre-rendered portions to the user device and/or transmit graphics painting instructions so that the browser on the user device does not have to execute the corresponding HTML code or the like. The browser function on the intermediary system may also be used to populate fields on web forms or the like, such as may be presented by third party websites.

For example, a browser hosted on a user device (sometimes referred to herein as a "user device browser") may issue a browse session request including network address information corresponding to a requested network resource, which may be in any form, including, but not limited to, an Internet Protocol ("IP") address, a URL, a Media Access Control ("MAC") address, etc. By way of illustration, the user may select or enter a URL, (e.g., http://www.xyzwebsite.com) into a browser window, causing the user device to transmit a request for a new browse session to the intermediary system, including the selected URL. The address or location of the intermediary system capable of servicing the browse session request may be hardcoded into the browser, may be configurable by the user, may be obtained from a network address service, or may be determined in any other way.

The browse session request, and subsequent resource requests, may also include identification information about the user device. The identification information can include, for example, the IP address or MAC address of the user device, cookies stored on the user device, beacons, and/or various HTTP headers or other data fields containing information about the user device (e.g., user agent, session-id, request-id, a unique browser identifier, etc.).

Prior to retrieving the requested network resource(s), the intermediary system can remove from the request some or all of the information identifying the user device and/or the user. The intermediary system may request the identified network resource(s) from one or more content providers, a content delivery network, or a local or associated cache component. For example, a browser software application (e.g., a headless browser) on the intermediary system can process a primary network resource and then generate additional content requests for content identified in one or more embedded resource identifiers (e.g. pictures, video files, etc.). Illustratively, in the case of non-browser applications, network resources or content may include any file type or format supported by the specific software application.

The degree to which identifying information is removed from the request may optionally be determined on a request-by-request basis so as to retrieve a resource that is adequately responsive to the request from the user device. For example, certain content providers may need the IP address or some other geolocation indicator in order to adequately respond to the request, such as mapping, movie screening times, and weather forecasting applications. When processing requests for resources from such content providers, the intermediary system may selectively permit the IP address of the user device to remain in the request, while selectively removing other identification information, such as cookies and HTTP headers. Such selectively may be based at least in part on privacy settings specified by the user and/or the intermediary system operator, which may be stored in a data store, such as in a user privacy settings record.

Having obtained a response from the content provider that includes the requested content (e.g., the requested network resource and embedded resources), the intermediary system may remove from the response some or all elements that were added to facilitate identification of the user device or its end user, such as beacons or other Web bugs. Optionally, the degree to which such identification elements are removed from the response may be determined on a case-by-case basis. For example, in certain cases, the intermediary system may selectively permit cookies to be stored on the user device to enable the user to receive the benefits of personalized responses that cookies can facilitate. Again, such selectively may be based at least in part on privacy settings specified by the user and/or the intermediary system operator.

The intermediary system can then identify a remote session browsing configuration specifying a remote session communication protocol for use in transmitting the requested content, user interaction data, intermediate processing results, and other information between the browser being executed on the user device and the browser being executed on the intermediary system. The information exchanged between the browser on the intermediary system and the browser on the user device can be generally referred to as "browser session information." As similarly noted above, the intermediary system may pre-process some or all of the requested content prior to providing it to the user device. For example, using a headless browser or otherwise, the intermediary system may pre-render portions or all of the requested network resources, and then transmit the pre-rendered portions to the user device and/or transmit graphics painting commands so that the browser on the user device does not have to execute the corresponding HTML code or the like.

Optionally, the user device browser may include a control for enabling and disabling a privacy mode. The privacy mode control may be persistently displayed, such as on the user device browser tool bar, or the control may be displayed in response to an event, such as the user requesting a non-secure or suspicious network resource. Optionally, an operator of the intermediary system and/or a given user may specify one or more privacy settings to be used globally or on a site basis, and the privacy settings may be accessed and used by the intermediary system in determining what user identification information may or may not be provided to third party sites. For example, the user may specify that no user identification information is to be shared with third party content sites. By way of further example, the user may specify that no identification information is to be shared with third party content sites, with certain specified site exceptions. The user may specify whitelists and/or blacklists of sites, where identification information may be provided to whitelisted sites, and identification information is not to be provided to blacklisted sites. By way of illustration, the user may specify that IP address information of the user device may be shared with a mapping service, a weather service, and a movie schedule service, but not with other services. By way of further illustration, the user may specify that the intermediary system or an associated website may store cookies (or other tracking tokens) on the user's computer device, but that other websites are not permitted to store cookies (or other tracking tokens) on the user's computing device.

In a particular example, when accessing a requested resource from a content provider in response to a browser request, the intermediary system may prevent the content provider to whom the resource request is directed to from:

determining referrer information (e.g., a web page that included the link that the user activated, which resulted in the network resource request);

accessing the IP Address of the computing device hosting the browser issuing the network resource request;

accessing the user-agent (the HHTP header indicating the browser type).

accessing a cookie or other tracking data stored on the user device or resident in a webpage being displayed on the user device (e.g., HTTP cookies, session cookies, third party cookies, FLASH cookies, beacons (e.g., non-visible or visible objects embedded into a webpage's HTML used to track who is viewing the page, at what time, and from what IP address) etc.); and/or accessing browser history.

Thus, in certain embodiments, when the intermediary system requests the resource from a content provider system, the content provider system will only have access to the intermediary system IP address and not that of the client computing system. In addition, as discussed above, the intermediary system may strip or otherwise block identification information, such as referrer information, user agent information, browser history information, and tracking token information (e.g., cookie information), sent by the user device browser in conjunction with the resource request and/or the intermediary system may block requests from the content provider system for such information. To further enhance anonymity and security, communication between the user device browser and the intermediary system may be on a secure, encrypted channel (e.g., using HTTPS protocol).

An optional benefit of certain embodiments is that some or all content may be pre-rendered by a proxy server, which may in turn provide the pre-rendered content to the browser hosted on the user device and/or may transmit graphics painting commands so that the browser on the user device does not have to execute the corresponding HTML code or the like, as similarly discussed above. This overcomes certain disadvantages of many conventional proxy services, the use of which may result in the slow loading and rendering of content on the user device browsers due to the delays resulting from the rerouting of requests and content.

In addition to providing for anonymous browsing, certain embodiments enable a user to engage in commerce or otherwise interact with third parties while maintaining anonymity with respect to such third parties. For example, certain embodiments enable a user to make purchases, receive shipments, and receive status information from third parties while maintaining user anonymity with respect to the third party. Further, certain embodiments enable a user to anonymously send communications and item returns to such third parties. In order to access certain anonymizer services, the user may need to provide identification information to the intermediary system (e.g., by providing login information, such as a user ID and password, by providing biometric information, such as a fingerprint scan, or otherwise), and the intermediary system may need to verify the identification information.

In certain embodiments, rather than using a payment instrument associated with the user, the user may use a payment instrument of another entity to make the purchase at a third party commerce site. For example, the user may cause information regarding a credit card, debit instrument, or other instrument of another entity, such as the operator of the intermediary system, to be submitted to the third party commerce site as a payment instrument.

The user device browser may be equipped with an anonymous payment control, anonymous email control, and/or an anonymous shipping control. The controls may be persistently displayed, such as on the user device browser tool bar, or the controls may be displayed in response to an event, such as the user pointing (using a mouse, track pad, finger, or other point device) at certain types of fields, such as payment, email, SMS, or shipping related field, or the user accessing a payment, email, SMS, or shipping details user interface.

When the user is accessing a third party site and wishes to make a purchase, typically a payment details interface is presented by the third party site. The user may activate the anonymous payment control which causes the user device browser or the intermediary system, via an intermediary system browser (e.g., using a headless browser) or otherwise, to automatically enter payment instrument information into the payment details interface, where the payment instrument information cannot be used by the third party to determine the user's identity. For example, the payment information may include a credit or debit card number, a credit or debit card expiration date, a credit or debit card security code, a user name on the credit or debit card, the credit or debit card billing address, etc. Optionally, the payment information is not displayed to the user. For example, the payment information may be provided to the third party commerce site via an API, headless browser, or otherwise, without displaying the information in the user interface being displayed by the user browser. Similarly, other information, such as anonymous email addresses, provided to third party sites via the intermediary system may optionally be provided via an API or otherwise, without displaying the information in the user interface.

The intermediary system operator may be the account holder, and not the user, for the payment instrument used to make the purchase. The holder of the payment instrument may then be charged or debited for the purchase amount by the third party commerce site. The user may in turn be charged or debited for the amount of the purchase (optionally plus a service fee), and the holder of the payment instrument may be accordingly reimbursed by the user. For example, the holder of the payment instrument or the operator of the intermediary system may access from a data store an account record for the user including information for one or more user payment instruments (e.g., a credit card, a debit card, a gift card, etc.) which can be charged or debited for the payment amount.

Optionally, the same holder payment instrument may be used to make purchases on behalf of many users of the intermediary system (e.g., hundreds, thousands, hundreds of thousands, or millions of unrelated users), making it particularly difficult for a merchant to determine the identity of the user making the purchase from the payment instrument information. Optionally, different holder payment instruments may be used to make purchases on behalf of different users or different sets of users of the intermediary system.

Similarly, in certain embodiments, in order to provide for anonymity with when having products shipped to the user, rather than providing a third party commerce site with a shipping address closely associated with the user, a shipping address may be specified that is not identifiably connected with the user. For example, rather than having the third party commerce site ship a product to the user's home address or office address, the user may have the product shipped to an address associated with a re-shipping service, such as may be offered by the intermediary system operator or by an independent entity. The re-shipping service may receive the shipped product and may then re-ship the product to a user address accessed from the user's account record (e.g., the user's home or work address), without revealing the user address to the third party commerce site. Optionally, the user is prompted via the user device browser to enter a shipping address for the user or to select an address from a list of addresses previously provided by the user.

Optionally, rather than having the product re-shipped to the user, the shipping address provided to the third party commerce site may be a destination, such as a retail establishment (e.g., a coffee shop, a restaurant, a department store, a supermarket, etc.), that is in the user's geographic vicinity, but is not directly tied to or easily traced to the user (e.g., not the user's home address, not the address of a close relative of the user, not the address of the user's place of employment, etc.). The user can then pick up the product at the destination. Optionally, the user can specify via a user interface what retail establishment or other destination should be used on a shipment-by-shipment basis, or the user may specify a preferred destination to be used for all future anonymous shipments, where the user can modify the destination address for a given shipment. For example, the user may specify the preferred destination via a user interface provided by the intermediary system and presented by the user device browser, or via a user interface coded directly into and presented directly by the user device browser.

As noted above, the user device browser may be equipped with an anonymous shipping control. When the user is accessing a third party site and wishes to provide shipping information and a shipping details interface is presented by the third party site, the user may activate the anonymous shipping control which causes the intermediary system to automatically enter anonymous shipping information (e.g., name of destination, address of destination, box number, etc.), into the shipping details interface (e.g., using a headless browser).

Optionally, in addition to any purchase receipt provided by the third party site, the intermediary system may provide a receipt, in the form of an email, SMS message, or otherwise, indicating the purchase amount paid to the third party, the amount charged to the user for the purchase (which may be the purchase amount plus a service fee or minus any discounts or coupons that may be offered by the intermediary system operator or its partners), and the final delivery shipping address, such as the user's home address or the address where the user is to pick up the item. Any taxes or other fees may be included in the purchase amount or may be itemized separately.

When a user wishes to provide or return an item to the third party commerce site for a refund, in certain embodiments, the user may apply a return shipping label provided by the third commerce site to a shipping container (e.g., a shipping box or envelope). For example, the return shipping label may have been included in the original shipment from the third party commerce site. In order to prevent the third party commerce site from determining the user's location from tracking information that the shipping service may provide to the third party commerce site, the user may drop off the package for shipment at a retail establishment or other entity participating in the re-shipping service, which will then ship the product back to the third party commerce site. Optionally, the re-shipping service or intermediate system may provide a return service, where the user can ship to the item to the re-shipping service using a shipping label provided by the re-shipping service that includes the re-shipping service address. The user may include in the shipping container a return shipping label provided by the third party commerce site. The re-shipping service may then remove the shipping label provided by the re-shipping service and apply the return shipping label provided by the third party. The re-shipping service may then ship the product back to the third party commerce site on behalf of the user.

Optionally, the user may specify via the user's privacy settings that, as a default, the intermediate system is to automatically populate a shipping details user interface or payment details interface with the anonymous shipping and payment information. Optionally, the user may specify that for certain specified sites the intermediate system is to automatically populate a shipping details user interface or payment details interface with the user's personal shipping and payment information and for other sites, the anonymous shipping and payment information is to be used. Optionally, the user may specify that if the user is in privacy mode the intermediate system is to automatically populate a shipping details user interface or payment details interface with the anonymous shipping and payment information, and if the user is not in privacy mode the intermediate system should not automatically populate a shipping details user interface or payment details interface with the anonymous shipping and payment information. The intermediate system may then act in accordance with the user's specification.

Optionally, the intermediate system may provide additional anonymity services, such as an anonymous email service or anonymous SMS service which may be used to communicate with third parties, such as third party commerce sites or individuals. For example, the third party commerce site shipping details user interface may have a field for receiving an email address. The third party commerce site may use the email address to provide an electronic purchase receipt, shipping status information, special offers or other promotional information, or the like. In order to preserve user anonymity, the intermediary system may assign a unique email address to the user which is optionally only used for the current purchase, or which may be used for multiple purchases with the third party commerce site, but not with other sites, or which may be used for multiple sites.

The email address generated and provided by the intermediary system may include a domain associated with the intermediary system. The local part of the email address provided by the intermediary system may optionally be randomly generated or may be an encrypted version of the user's email so that it appears randomly generated. The intermediary system may store the anonymous email address in the user's account record or otherwise associate the anonymous email address with the user's actual email address. For example, the intermediary system may store a data store of multiple email addresses generated by the intermediary system and the corresponding user email address. Of course, a given user email address may be associated with multiple intermediary system-generated email addresses.

The intermediary system may populate the email address field in the user interface associated with the third party commerce site with an anonymous email address in response to the user activating a corresponding control, or the system may automatically populate the email address field with an anonymous address based on privacy settings previously specified by the user or the intermediary system operator. The control may be persistently displayed, such as on the user device browser tool bar, or the control may be displayed in response to an event, such as the user pointing (using a mouse, track pad, finger, or other point device) at an email address field, or the user accessing certain types of user interfaces, such a payment or shipping details user interface.

When the third party sends an email to the user using the anonymous email address, the email may be received by the intermediary system. The intermediary system may determine the user's actual address by searching users' account records to determine a match or by looking up the user's email using a data store storing an association of user email addresses with anonymous email addresses. If the anonymous email address includes an encrypted version of the user's email address, the intermediary system may decrypt the anonymous email address to determine the user's email address. The intermediary system will then forward the third party commerce site email to the user, optionally with a "from" address associated with the intermediary system. The intermediary system may add a code to the email, where the code may be associated with the third party commerce site address, or may include the third party commerce site email address within the email. If the user sends a reply email, it will be received by the intermediary system, which will determine the third party commerce site address via the code, the third party commerce site email address included in the email, or otherwise. If a code is used, the intermediary system may strip the code and the user's email address out of the email, and forward the email to the third party commerce site using the third party commerce site address and without revealing the user's identity.

Similarly, the intermediate system can provide to the third party an anonymous SMS address (or other electronic address) that is associated with the intermediate system. The intermediary system may store the anonymous SMS address in the user's account record or otherwise associate the anonymous SMS address with the user's actual SMS address. For example, the intermediary system may maintain a data store of multiple SMS addresses provided by the intermediary system in association with the corresponding user SMS address.

The intermediary system may populate the SMS address field in the user interface associated with the third party commerce site with an anonymous SMS address in response to the user activating a corresponding control, or the system may automatically populate the SMS address field with an anonymous address based on privacy settings previously specified by the user or the intermediary system operator. The control may be persistently displayed, such as on the user device browser tool bar, or the control may be displayed in response to an event, such as the user pointing (using a mouse, track pad, finger, or other point device) at an SMS address field, or the user accessing certain types of user interfaces, such a payment or shipping details user interface.

When the third party sends an SMS message to the user using the anonymous SMS address, the SMS message may be received by the intermediary system. The intermediary system may determine the user's actual SMS address by searching users' account records to determine a match or by looking up the user's SMS message using a data store storing an association of user SMS addresses with anonymous SMS addresses. The intermediary system will then forward the third party commerce site SMS message to the user, optionally with a "from" address/phone number associated with the intermediary system.

Example embodiments will now be discussed with reference to the figures.

System Components

FIG. 1 illustrates an example network environment in which features can be implemented for processing content pages at an intermediary system and generating display commands for execution at a user device. The network environment shown in FIG. 1 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. Or combination thereof, each with access to and/or from the Internet.

As will be appreciated by those of skill in the relevant art, a network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to groups of current or potential user devices 102 or content sources 106, 108. In such a configuration, a user device 102 may request content via the intermediary system 104 to which it is closest, rather than all user devices 102 requesting content via a single intermediary system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108. The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120) can execute the remote-generated display commands to display a representation of the requested content on the user device 102. Advantageously, the remote graphics module 122 may facilitate the display of graphical representations of requested content at the user device 102 without requiring the user device 102 to receive content files (e.g., HTML files, JPEG images, etc.) directly or indirectly from content sources 106 and 108.

In some embodiments, the browser 120 may be a conventional web browser that is not specifically designed or configured to execute remotely-generated graphics commands and other display commands. For example, the browser 120 may use or otherwise be associated with a remote graphics module 122 that is not integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate display commands for execution by the user devices 102. For example, the intermediary system 104 can be a server or group of servers that may be accessed via the network 110. In some embodiments, the intermediary system 104 may be include a proxy server, a system operated by an internet service provider (ISP), or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server that on which the headless browser 140 is executing. Instead, the headless browser 140 provides display commands to separate user devices 102. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability.

The headless browser 140 may include various modules to provide the functionality described above and in greater detail below. For example, the headless browser 140 may include: a content processing module 150 that parses content files and generates a document object model ("DOM") representation of the content; a graphics processing module 152 that receives the DOM representation and generates display commands (e.g., SKIA commands) to render a graphical representation of the content at a user device 102; and an interaction processing module 154 that communicates with the browser 120 to receive information regarding interactions with the content at the user device 102 and to update the graphical representation of the content if necessary. In some embodiments, a headless browser 140 may include additional or fewer modules than those shown in FIG. 1.

The intermediary system 104 may include an anonymizer module 158, which may anonymize the source of resource requests, communications between a user and a third party system, and facilitate anonymized shipping to inhibit the third party's ability to determine the user's identity.

The intermediary system 104 may include additional modules, components, data stores, and the like to provide the features described above and in greater detail below. For example, the intermediary system 104 may include a cache 142 that stores content items received form content sources 106 and 108, graphics commands generated by the headless browser 140, and the like. The intermediary system 104 may also include a logged user behaviors data store 144 that stores information about user requests and interactions with content.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

The origin content servers 106 and/or CDN servers 108 may be associated with a respective commerce entity, such as may offer items for sale (where the term "sale" as used herein includes license, loan, etc.) to users. For example, the origin content servers 106 and/or CDN servers 108 may host an electronic catalog of items (e.g., goods, services, download content, streaming content, etc.) which a user can search or browse, and via which the user can purchase or otherwise acquire a desired item. By way of illustration, an origin content server or CDN server may provide user interfaces over a network to a user device via which a user can specify a form of payment, and where applicable, via which a user can provide shipping information, such as a shipping address. By way of further illustration, an origin content server or CDN server may provide user interfaces over a network to a user device via which a user can indicate that the user wishes to return a purchased item. In response, the origin content server or CDN server (or other associated system) may generate and provide to the user a return shipping label. The shipping label may include a return merchandise authorization number (an "RMA)", and may include prepaid shipping. The return shipping label may be transmitted to the user device as a printable document which the user may print out and affix to the item package for shipping back to the commerce entity from which the item was purchased. The origin content servers 106 and/or CDN servers 108 may also be configured to communicate with users via email, SMS messages, or otherwise.

With reference to FIGS. 2-6, example processes of anonymized interaction are illustrated, where the processes may be performed via the various components of the example networked computing environment illustrated in FIG. 1.

Referring now to FIG. 2, at block 202 a resource request is received over a network at an intermediate system, such as intermediate system 104, from a browser hosted on a user device, such as user device 102. The request, and other communication between the user device 102 and the intermediate system 104, may be over a secure channel, such as a channel using HTTPS protocol. At block 204, the intermediate system 104 determines whether a privacy mode has been activated. For example, the user may have activated the privacy mode via a privacy mode control (e.g., by selecting a button or menu item) on the user browser, or the privacy mode may have been set as a default in a user privacy settings record or by an administrator. The selection of the privacy control can be handled as both a local user interaction and a remote user interaction. The processing for providing an indication that the privacy mode has been selected (e.g., via a privacy icon, via text, by coloring the frame or tab of the browser window with a color indicating the privacy mode has been activated, or otherwise) may be performed by the browser hosted on the user device 102. If the privacy mode is dynamically set by the user via a browser privacy control, a privacy mode indication may be transmitted by the browser to the intermediate system 104. The intermediate system 104 may then proceed handling interactions between the user and the requested resource utilizing the enabled privacy techniques for the user, until the user deactivates the privacy mode (e.g., by reselecting the privacy mode control or otherwise).

If the privacy mode has not been set, then at block 218 the intermediate system 104 may forward, via a headless browser, the unfiltered resource request to the corresponding destination, such as origin content servers 106 or CDN servers 108. At block 220, the intermediate system 104 may receive the requested content from origin content servers 106 or CDN servers 108. At block 220, the intermediate system 104 may transmit the unfiltered content to the user device 102.

If the privacy mode has been set, then at block 206 the intermediate system 104 may access a privacy settings record that has been customized by the user or may access a generic privacy settings record to be used when a given user activates the privacy mode. As similarly discussed above, the privacy settings may indicate whether the user's IP address is to be provided to a given website, whether cookie or web bug information is to be provided to a given website, whether referrer information is to be provided, whether user-agent information is to be provided, etc. The privacy settings may be transmitted by the browser hosted on the user device, or they may be stored on the intermediate system, by way of example.

At block 208, the intermediate system 104 filters out identification information in accordance with the privacy settings. For example, the intermediate system 104 may strip out the user's IP address, cookie information, web bug information, referrer information, and/or user-agent information, if so specified by the privacy settings. At block 210, the intermediate system 104 transits the filtered request to the requested resource (e.g., the origin content servers 106 or CDN servers 108). At block 212, the intermediate system 104 receives content from the requested resource. At block 214, the intermediate system 104 filters out item from the content in accordance with the privacy settings. For example, the intermediate system 104 may strip out some or all elements that were added to facilitate identification of the user device or its end user, such as cookies or beacons. At block 216, the intermediate system 104 may transmit the filtered content over the network to the user device 102.

Referring now to FIG. 3, an example process is illustrated by which anonymized payment is performed. At block 302, content, such as a webpage, is received at the intermediate system (e.g., by a headless browser) from a content provider, such as origin content servers 106 or CDN servers 108. The content may be provided as a result of a previous interaction of a user with a website hosted by origin content servers 106 or CDN servers 108. For example, the content provider may be a commerce entity, and the website may provide access to an electronic catalog of items. The user may have initiated a purchase process (e.g., by adding an item to an online shopping cart and activating a checkout control provided by the commerce entity website). At block 304, a determination is made by the intermediate system 104 as to whether the content includes a payment form. For example, the intermediate system may examine terms and phrases in the content to determine if they correspond to a payment form. Example phrases may include "payment information", "credit card", "debit card", "card number", "expiration date", the name of a third party payment processor, etc. The terms and phrases may be accessed from a data store of such terms included in or accessible by the intermediated system 104.

If a determination is made that the content includes a payment form, a determination may be made by the intermediate system 104 as to whether the user authorized anonymized payment. For example, the user may have activated an anonymized payment submission control provided by the browser on the user device. If the user did not authorize anonymized payment, then the intermediate system 104 takes no action in that regard. If the user did authorize anonymized payment, then at block 310 the intermediate system 104 provides payment information to the content provider. For example, the intermediate system 104 may fill in payment form fields with the requested payment information using information associated with a payment instrument that the content provider cannot use to identify the user. By way of illustration, the intermediate system 104 may insert credit card, debit card, or other payment instrument information as well billing address information associated with payment instrument owned or controlled by the operator of the intermediate system 104 or a partner thereof.

The payment information may be provided via the headless browser, optionally without displaying the information to the user, by entering the information into the corresponding payment form fields, or the payment information may be provided via an API, or otherwise. Optionally, even though the anonymized account information is not displayed by the user browser, the intermediate system 104 may cause feedback to be provided to the user indicating that the payment information has been entered into the payment form prior to submitting the information to the content provider. For example, the intermediate system may cause a string of the letter "x" or other character or symbol to appear in the payment fields displayed on the user browser. The user may be prompted to then approve the submission of the payment information to complete the purchase. If the content provider provides an order confirmation number or other order identifier via a webpage, email, or otherwise, the order identifier may be stored in a transaction record, in addition to other transaction related information, such as the transaction amount, the name of the content provider/seller, the locator (e.g., URL) of the content provider site, the name or description of the item purchased, the purchase date, and the like.

At block 312, the intermediate system 104 causes the user to be charged the purchase amount, optionally plus a service fee. The user may be charged via a payment instrument accessed from the user's account record or the user may be prompted select a payment instrument stored in the user's account record or to provide payment instrument information during the purchase process, prior to the submission of the anonymized payment submission to the content provider. An indication that the user was charged, and the amount of the charge, may be stored in the transaction record. The holder of the anonymized payment instrument may then optionally be reimbursed for the purchase amount, optionally plus a service fee.

Referring now to FIG. 4, an example process is illustrated by which anonymized shipping is performed, according to one embodiment. At block 402, content, such as a webpage, is received at the intermediate system (e.g., by a headless browser) from a content provider, such as origin content servers 106 or CDN servers 108. The content may be provided as a result of a previous interaction of a user with a website hosted by origin content servers 106 or CDN servers 108. For example, the content provider may be a commerce entity, and the website may provide access to an electronic catalog of items. The user may have initiated a purchase process (e.g., by adding an item to an online shopping cart and activating a checkout control provided by the commerce entity website). At block 404, a determination is made by the intermediate system 104 as to whether the content includes a shipping address form. For example, the intermediate system 104 may examine terms and phrases in the content to determine if they correspond to a payment form. Example phrases may include "shipping address", "is shipping address different than the billing address," or the like. The terms and phrases may be accessed from a data store of such terms included in or accessible by the intermediated system 104.

If a determination is made that the content includes a shipping address form, at block 406 a determination may be made by the intermediate system 104 as to whether the user authorized submission of an anonymized shipping address. For example, the user may have activated an anonymized shipping submission control provided by the browser on the user device. If the user did not authorize submission of anonymized shipping information, then the intermediate system 104 takes no action in that regard, and at block 416 the user may enter the user's shipping address. If the user did authorize submission of an anonymized shipping address, then at block 408 the intermediate system 104 provides an anonymized shipping address to the content provider. For example, the intermediate system 104 may fill in the shipping address field using a shipping address from which the content provider cannot determine the user's identity. By way of illustration, the intermediate system 104 may insert a shipping address associated with a destination controlled by the operator of the intermediate system 104 or a partner thereof. The shipping address may include a new, unique addressee name generated by the intermediate system 104 for just this shipment. For example, the addressee name may include the actual name of a re-shipping service plus a unique code associated with just this shipment. The shipping address, including the unique name or name portion, may be stored by the intermediate system as part of a transaction record associated with the user-content provider interaction. The transaction record may store an indication as to which user account is associated with the transaction. The user account information may include the user's shipping information, billing information, and the like.

The shipping information may be provided via the headless browser, with or without displaying the information to the user. If the shipping information is not to be displayed by the user, the intermediate system may enter the shipping information into the corresponding shipping information form fields, or the shipping information may be provided via an API, or otherwise. Optionally, even though the shipping information is not displayed by the user browser, the intermediate system 104 may cause feedback to be provided to the user indicating that the shipping information has been entered into the shipping information form prior to submitting the information to the content provider. For example, the intermediate system may cause a string of the letter "x" or other character or symbol to appear in the shipping form fields displayed on the user browser. Optionally, if the shipping form has a selection to use the billing address as the shipping address, and the billing address is the same as the shipping address, the intermediate system may make the corresponding selection without entering a separate shipping address. The user may be prompted to then approve the submission of the shipping information to complete the purchase. Before or after being prompted to approve the submission of the shipping information, the user may be prompted by the intermediate system 104 to select a user address already stored in the user's account record to which the item is to be forwarded to, or the user may be prompted to select from third party commerce site as a destination from a list of third party commerce sites provided for display on the user browser by the intermediate system 104. Optionally, the user may be prompted to manually enter a forwarding address.

Optionally, the intermediate system 104 may offer the user ancillary services and/or accessory products based at least in part on the item being purchased. For example, the intermediate system 104 may provide a user interface for presentation to the user asking the user if the user wants the item to be gift wrapped for a fee (or optionally without charge) or if the user wants a gift card included with the item for a fee (or optionally without charge). By way of further example, based at least in part on the item type, the intermediate system 104 may identify the item being purchased as a television (e.g., from information obtained during the purchase process or via information provided by the seller or the user), and identify related services, such as installation, and products, such as a streaming media player or DVD player. For example, the related services may be identified by the intermediate system 104 from a look-up table, database or other repository that indicates potential services for various product types or categories. The intermediate system 104 may provide a user interface for presentation to the user asking the user if the user wants to purchase the related service(s) or product(s) at respective specified fees. If the user indicates that the user wants to receive the related product(s) or service(s) the intermediate system 104 will receive and store the indication in association with the user record and charge the user accordingly via a user payment instrument. Optionally, certain related services and products may be offered without a fee (for free), in which case the user may receive such free user-selected products and services without being charged. Optionally, a purchased related item may be packaged and shipped together with the item purchased from the commerce entity when received by the re-shipping service at state 410 and shipped at state 414. Optionally, the intermediate system 104 may cause the purchased related item to be packaged and shipped separately from the item purchased from the commerce entity.

At block 410, the re-shipping service receives the item shipped by the content provider. At block 412, the intermediate system 104 accesses the shipping address or destination (e.g., a retail establishment) specified by the user. For example, the intermediate system may use the unique addressee name information on the shipping label applied by the content provider to the item package to access the corresponding transaction record stored by the intermediate system 104. The transaction record may include the user specified shipping address or destination, or the transaction record may include an association with a user account record that includes the user's shipping address or other destination. The intermediate system 104 or the re-shipping service may then print a shipping label including the user's shipping address or destination. At block 414, the re-shipper may then apply the label to the item package and forward the package to the user at the user specified address or destination. The user may then receive the item. As discussed above, optionally one or more purchased related items may be packaged with and/or shipped together with the item purchased from the commerce entity. Optionally, once the intermediate system 104 determines (e.g., from shipping status information received from a shipping system or an indication provided by the user) that the item purchased from the commerce entity has been received by the user, the intermediate system 104 may cause a related purchased service to be provided (e.g., providing installation for a purchased television).

Referring to FIG. 5, an example process is illustrated by which an anonymized item return may be performed, according to one embodiment. At block 502, the intermediate system 104 receives an item return request from a user. The item return request may be submitted via an item return form provided by the intermediate system 104 for display on the browser hosted by the user device 102. The form may include a field to receive an order identifier, such as an order confirmation number, earlier provided to the user by the intermediate system 104. The order identifier may have been earlier generated by the content provider or by the intermediate system 104. The intermediate system 104 may use the order identifier to access the corresponding transaction record. An indication that the user requested the item return may be stored in the transaction record. At block 504, the intermediate system submits a return request to the content provider from which the item was purchased. For example, the intermediate system 104 may access the locator associated with the content provider from the transaction record, and then use the locator to access the content provider site. The intermediate system may crawl the content provider site to identify a page via which a return request may be submitted. The intermediate system 104 may provide the information requested by the item return page. For example, the item return page may request an order identifier, such as an order confirmation number, that had been provided by the content provider when the purchase was made.

At block 506, the intermediate system 104 receives a printable shipping label document from the content provider. The shipping label document may include a return shipping address associated with the content provider and an RMA number (which may be encoded in a barcode or the like). At block 508, the intermediate system 104 generates a printable shipping label document that includes a return shipping address associated with the re-shipping service. The return shipping label generated by the intermediate system 104 may include a code (optionally encoded in a barcode or other computer readable indicia) that includes a unique identifier. The code may be stored in the associated transaction record.

At block 510, the intermediate system 104 provides the user with the printable shipping label document, that includes a return shipping address associated with the re-shipping service, via an email attachment, a downloadable file, or otherwise. The user may then printout and apply the label to the package in which the item is being returned. Optionally, a hardcopy of the shipping label may be mailed to the user for application to the package. At block 512, the re-shipping service receives the package from the user. The intermediate system 104 may scan or otherwise obtain the unique code from the shipping label to identify the corresponding transaction record. The intermediate system 104 may update the transaction record to indicate that the item has been received from the user.

At block 514, the intermediate system 104 provides the re-shipper service with the return label document received from the content provider and the re-shipper service removes the return label that the user applied to the package, and applies the return label from the content provider to the package. At block 516, the re-shipping service ships the package to the content provider. At block 518, the intermediate system 104 receives a refund from the content provider, where the refund is applied to the anonymized payment instrument used to purchase the item. At block 520, the intermediate system 104 provides the refund to the user, by applying the refund to the user payment instrument which was previously charged for the item, in accordance with a refund preference previously specified by the user, by issuing a corresponding check to the user, or otherwise.

Referring to FIG. 6, an example process by which an anonymized communication is performed, according to one embodiment. At block 602, content, such as a webpage, is received at the intermediate system (e.g., by a headless browser) from a content provider, such as origin content servers 106 or CDN servers 108. The content may be provided as a result of a previous interaction of a user with a website hosted by origin content servers 106 or CDN servers 108. For example, the content provider may be a commerce entity, and the website may provide access to an electronic catalog of items. The user may have initiated a purchase process (e.g., by adding an item to an online shopping cart and activating a checkout control provided by the commerce entity website). At block 604, a determination is made by the intermediate system 104 as to whether the content includes a field configured to receive an email address. For example, the intermediate system 104 may examine terms and phrases in the content to determine if they correspond to an email field. An example phrase may include "email," "enter email address," or the like. The terms and phrases may be accessed from a data store of such terms included in or accessible by the intermediated system 104.

If a determination is made that the content includes an email address field, at block 606, a determination may be made by the intermediate system 104 as to whether the user authorized submission of an anonymized email address. For example, the user may have activated an anonymized email address submission control provided by the browser on the user device. If the user did not authorize submission of anonymized email address, then the intermediate system 104 takes no action in that regard, and at block 616 the user may enter the user's email address.

If the user did authorize submission of an anonymized email address, then at block 608 the intermediate system 104 provides the anonymized email address, via the email address field, to the content provider. For example, the intermediate system 104 may insert an email address associated with or controlled by the operator of the intermediate system 104 or a partner thereof. The anonymized email address may be a unique email address generated by the intermediate system 104 for the particular interaction between the user and the content provider. For example, the email address may be provided so that the content provider may email to the user information regarding a purchase made by the user from the content provider. The unique email address may be stored by the intermediate system as part of a transaction record associated with the purchase transaction. As similarly discussed above, the transaction record may store an indication as to which user account is associated with the transaction. The user account information may include the user's shipping information, billing information, and the like.

The anonymized email address may be provided via the headless browser, with or without displaying the information to the user. If the email address is not to be displayed by the user, the intermediate system may enter the email address into the corresponding email address field, or the email address may be provided via an API, or otherwise. Optionally, even though the email address is not displayed by the user browser, the intermediate system 104 may cause feedback to be provided to the user indicating that the email address has been entered into the email address field prior to submitting the information to the content provider. For example, the intermediate system may cause a string of the letter "x" or other character or symbol to appear in the email address field displayed on the user browser. The user may be prompted to then approve the submission of the email address to the content provider. Before or after being prompted to approve the submission of the email address, the user may be prompted by the intermediate system 104 to select a user email address already stored in the user's account record to which email from the content provider is to be forwarded to, or the user may be prompted to manually enter a forwarding email address.

At block 610, the intermediate system 104 receives email sent by the content provider. At block 612, the intermediate system 104 accesses the forwarding email address specified by the user. For example, the intermediate system may use the unique email address to which the email is directed to access the corresponding transaction record stored by the intermediate system 104. The transaction record may include the user specified email forwarding address or may include an association with a user account record that includes the user's email address. At block 614, the intermediate system 104 may then forward the content provider's email to the forwarding email address. The user may then receive the content provider's email address. By way of example, the email from the content provider may be regarding a purchase confirmation or shipping status.

It is understood that some or all of the various states of the process discussed above may be combined into a single process, such as part of a purchase transaction, where an online merchant requests a shipping address, payment information, and an email address in order to complete a purchase.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computing system comprising one or more computing devices, said computing system programmed to implement:
   a proxy server configured to receive requests, for network resources hosted on third party sites, from browsers hosted on remote computing devices and to perform one or more browser functions on behalf of the browsers hosted on remote computing devices, the proxy server further comprising an anonymizer module, the proxy server configured to:
     receive, over a network, a request for a network resource hosted on a third party site, the request received over a secure, encrypted channel from a user computing device configured with a browser application,
     wherein the browser application of the user computing device is in communication with the proxy server, and
     wherein the request includes browser session and identification data associated with the user computing device, the data comprising at least one of an IP address of the user computing device, a MAC address of the user computing device, a cookie stored on the user computing device, a beacon, a session-id, a request-id, a user agent identifier, or a unique browser identifier;
     in response to receiving the request from the user computing device for the network resource hosted on the third party site, transmit over the network, to a network resource provider comprising the third party site, a request for the network resource requested by the user computing device, wherein the request transmitted to the network resource provider does not comprise at least a portion of the identification data included in the request received from the user computing device;
     receive, over the network, a first response from the network resource provider comprising the third party site, the first response including a user interface comprising one or more corresponding form fields configured to receive shipping address information to which an item is to be shipped to as part of a transaction;
     determine, using an examination of phrases associated with the first response, that the response comprises a shipping webpage comprising shipping form fields;
     provide an anonymous shipping control via which the user can indicate whether an anonymous shipping address associated with a different entity than the user, is to be used as a shipment destination is to be used for the shipment of the item, wherein if the user does not activate the anonymous shipping control an anonymous shipping address will not be used for the shipment of the item;
     receive, over the network, from the browser application an indication that the user has activated the anonymous shipping control;
     receive, over the network, an indication from the user as to which shipping address is to be used as a final destination shipping address;
     generate an anonymous email address and assign the anonymous email address to be used, with respect to email communications, only for the transaction involving the shipment of the item;
     automatically populate corresponding shipping form fields with the anonymous shipping address, and enable the anonymous shipping address to be provided to the network resource provider;
   scan information from a shipping-related label on the item after receipt at the anonymous shipping address, wherein the shipping-related label does not include the final destination shipping address;
   identify the final destination shipping address using the information scanned from the shipping-related label on the received item;
   cause, at least in part, the received item to be shipped to the final destination shipping address.

2. The system of claim 1, the proxy server further configured to:
   receive an item return request from the browser application;
   generate a first shipping label document, including a first unique identifier and a destination address associated with a re-shipping service, for application on packaging for the item being returned;
   provide the first shipping label document to the user computing device;
   receive an indication that the packaged item has been received at the re-shipping service, the indication based at least in part on a reading of the first unique identifier; and
   provide a second shipping label document including an address associated with a seller of the item being returned for application to the item packaging.

3. The system of claim 1, the proxy server further configured to determine that a document comprises fields configured to receive shipping address information based at least in part on an examination of terms in the document.

4. The system of claim 1, wherein the anonymous shipping address is unique to the user.

5. The system of claim 1, the proxy server further configured to:
   identify a first ancillary service, or a first accessory product, or both a first ancillary service and a first accessory product associated with the item;

transmit an offer of at least one of the identified first ancillary service or the identified first accessory product to the browser application of the user computing device.

6. The system of claim 1, the proxy server further configured to:
identify one or more accessory products associated with the item;
transmit an offer of one or more of the identified accessory products to the browser application of the user computing device;
receive an acceptance from the browser application of the user computing device of an offer for a first of the identified accessory products;
cause the first identified accessory product to be packaged with the item after the item is received at the anonymous shipping address and before the item is received at the final destination address.

7. The system of claim 1, the proxy server further configured to:
identify one or more ancillary services associated with the item;
transmit an offer of one or more of the identified ancillary services to the browser application of the user computing device;
receive an acceptance from the browser application of the user computing device of an offer for a first of the identified ancillary services; and
at least partly in response to determining that the item has been delivered to the final destination address, causing the first ancillary service to be provided.

8. A computer storage system comprising a non-transitory storage device, said computer storage system having stored thereon executable program instructions that direct a computer system to at least:
receive a request transmitted over a network for a network resource hosted on a third party site, the request received over a secure, encrypted channel from a user computing device configured with a browser application,
wherein the browser application of the user computing device is in communication with the computer system, and
wherein the request includes browser session and identification data associated with the user computing device, the data comprising at least one of an IP address of the user computing device, a MAC address of the user computing device, a cookie stored on the user computing device, a beacon, a session-id, a request-id, a user agent identifier, or a unique browser identifier;
in response to receiving the request for the network resource hosted on the third party site, transmit over the network, to a network resource provider comprising the third party site, a request for the network resource requested by the user computing device, wherein the request transmitted to the network resource provider does not comprise at least a portion of the identification data included in the request received from the user computing device;
receive a first response from the network resource provider comprising the third party site, the first response including a user interface comprising one or more fields configured to receive shipping address information to which an item is to be shipped to as part of a transaction;
determine, using an examination of phrases associated with the first response, that the response comprises a shipping webpage comprising shipping form fields;
provide an anonymous shipping control via which the user can indicate whether an anonymous shipping address associated with a different entity than the user, is to be used as a shipment destination is to be used for the shipment of the item, wherein if the user does not activate the anonymous shipping control an anonymous shipping address will not be used for the shipment of the item;
receive over the network, from the browser application an indication that the user has activated the anonymous shipping control;
receive an indication from the user as to which shipping address is to be used as a final destination shipping address;
generate an anonymous email address and assign the anonymous email address to be used, with respect to email communications, only for the transaction involving the shipment of the item;
automatically populate corresponding shipping form fields with the anonymous shipping address, and enable the anonymous shipping address to be provided to the network resource provider;
scan information from a shipping-related label on the item after receipt at the anonymous shipping address, wherein the shipping-related label does not include the final destination shipping address;
identify the final destination shipping address using the information scanned from the shipping-related label on the received item;
cause, at least in part, the received item to be shipped to the final destination shipping address.

9. The computer storage system of claim 8, wherein the program instructions are further configured to direct the computer system to:
receive an item return request from the browser application;
generate a first shipping label document, including a first unique identifier and a destination address associated with a re-shipping service, for application on packaging for the item being returned;
provide the first shipping label document to the user computing device;
receive an indication that the packaged item has been received at the re-shipping service, the indication based at least in part on a reading of the first unique identifier; and
provide a second shipping label document including an address associated with a seller of the item being returned for application to the item packaging.

10. The computer storage system of claim 8, wherein the program instructions are further configured to direct the computer system to:
identify a first ancillary service, or a first accessory product, or both a first ancillary service and a first accessory product associated with the item;
transmit an offer of at least one of the identified first ancillary service or the identified first accessory product to the browser application of the user computing device.

11. The computer storage system of claim 8, wherein the program instructions are further configured to direct the computer system to:
identify one or more accessory products associated with the item;

transmit an offer of one or more of the identified accessory products to the browser application of the user computing device;

receive an acceptance from the browser application of the user computing device of an offer for a first of the identified accessory products;

cause the first identified accessory product to be packaged with the item after the item is received at the anonymous shipping address and before the item is received at the final destination address.

12. The computer storage system of claim 8, wherein the program instructions are further configured to direct the computer system to:

identify one or more ancillary services associated with the item;

transmit an offer of one or more of the identified ancillary services to the browser application of the user computing device;

receive an acceptance from the browser application of the user computing device of an offer for a first of the identified ancillary services; and at least partly in response to determining that the item has been delivered to the final destination address, causing the first ancillary service to be provided.

\* \* \* \* \*